US012741647B2

(12) United States Patent
Kawashima

(10) Patent No.: US 12,741,647 B2
(45) Date of Patent: Sep. 22, 2026

(54) CONTROL DEVICE OF VEHICLE AND CONTROL METHOD OF VEHICLE

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/584,627

(22) Filed: Feb. 22, 2024

(65) Prior Publication Data

US 2024/0286616 A1 Aug. 29, 2024

(30) Foreign Application Priority Data

Feb. 28, 2023 (JP) ................................ 2023-029761

(51) Int. Cl.
*B60W 30/182* (2020.01)
*B60W 30/14* (2006.01)
*B60W 60/00* (2020.01)

(52) U.S. Cl.
CPC ........ *B60W 30/182* (2013.01); *B60W 30/146* (2013.01); *B60W 60/0053* (2020.02); *B60W 2520/10* (2013.01); *B60W 2540/12* (2013.01)

(58) Field of Classification Search
CPC ............. B60W 30/182; B60W 30/146; B60W 60/0053; B60W 2520/10; B60W 2540/12; B60W 2050/0027; B60W 2556/40; B60W 2556/50; B60W 2720/106; B60W 30/09; B60W 60/001; B60W 50/00; B60W 2050/0005
See application file for complete search history.

(56) References Cited

U.S. PATENT DOCUMENTS 9,873,412 B2 * 1/2018 Moriizumi ................ B60T 7/22
2015/0353093 A1 * 12/2015 Pallett ................... B60W 10/06 701/48
2016/0075313 A1 * 3/2016 Moriizumi ................ B60T 7/22 701/93

(Continued)

FOREIGN PATENT DOCUMENTS

EP 4 052 982 A1 9/2022
JP 2001-18770 A 1/2001
JP 2005-306320 A 11/2005

(Continued)

*Primary Examiner* — Jason Holloway
(74) *Attorney, Agent, or Firm* — Sughrue Mion, PLLC

(57) ABSTRACT

A processor of an ECU includes: a deceleration amount calculation unit that calculates a first deceleration amount for controlling deceleration of a vehicle during vehicle driving in an automatic driving mode; a deceleration amount acquisition unit that acquires a second deceleration amount of the vehicle according to an operation of a brake pedal when a driver operates the brake pedal; a deceleration control unit that controls deceleration of the vehicle by using a greater value of the first deceleration amount and the second deceleration amount when the second deceleration amount is equal to or less than a predetermined threshold value during vehicle driving in the automatic driving mode; and a stopping unit that stops the automatic driving mode when the second deceleration amount exceeds the predetermined threshold value.

2 Claims, 2 Drawing Sheets

(56) References Cited

U.S. PATENT DOCUMENTS

| | | | | |
|---|---|---|---|---|
| 2016/0121906 | A1 | 5/2016 | Matsuno et al. | |
| 2021/0300342 | A1* | 9/2021 | Hara .................. | B62D 15/0285 |

FOREIGN PATENT DOCUMENTS

| | | | |
|---|---|---|---|
| JP | 2016-88180 | A | 5/2016 |
| JP | 2017-43304 | A | 3/2017 |
| JP | 2020-104763 | A | 7/2020 |
| JP | 2022-134541 | A | 9/2022 |
| JP | 2022-161212 | A | 10/2022 |
| WO | 2014/174585 | A1 | 10/2014 |

* cited by examiner

CONTROL DEVICE OF VEHICLE AND CONTROL METHOD OF VEHICLE

FIELD

The present invention relates to a control device of a vehicle and a control method of a vehicle.

BACKGROUND

Conventionally, as described in Japanese Unexamined Patent Publication (Kokai) No. 2016-088180, it is known to stop automatic driving control when there is a driving operation by a driver in a traveling control device that performs automatic driving control.

SUMMARY

Technical Problem

Even when a vehicle travels by automatic driving, a driver is required to monitor a surrounding situation, and perform a crisis avoidance operation such as a brake operation in order to avoid a crisis when the crisis is recognized. However, according to the technique described in the patent literature described above, there is a problem that, when there is a driving operation by a driver, automatic driving control is stopped even in a case where the driver does not desire to stop automatic driving control. In this way, for a driver who does not desire to end automatic driving, the end of automatic driving by a driving operation causes a decrease in convenience.

In view of the problem described above, an object of the present disclosure is to provide a control device of a vehicle and a control method of a vehicle capable of optimally controlling deceleration of a vehicle, based on a deceleration amount when a vehicle is driven in an automatic driving mode and a deceleration amount according to an operation of a brake pedal by a driver.

Solution to Problem

A summary of the present disclosure is as follows.

(1) A control device of a vehicle includes:
  a processor configured to:
  calculate a first deceleration amount for controlling deceleration of a vehicle during vehicle driving in an automatic driving mode;
    acquire a second deceleration amount of the vehicle according to an operation of a brake pedal when a driver operates the brake pedal;
    control deceleration of the vehicle by using a greater value of the first deceleration amount and the second deceleration amount when the second deceleration amount is equal to or less than a predetermined threshold value during vehicle driving in the automatic driving mode; and
    stop the automatic driving mode when the second deceleration amount exceeds the predetermined threshold value.

(2) A control method of a vehicle includes:
  calculating a first deceleration amount for controlling deceleration of a vehicle during vehicle driving in an automatic driving mode;
  acquiring a second deceleration amount of the vehicle according to an operation of a brake pedal when a driver operates the brake pedal;
  controlling deceleration of the vehicle by using a greater value of the first deceleration amount and the second deceleration amount when the second deceleration amount is equal to or less than a predetermined threshold value during vehicle driving in the automatic driving mode; and
  stopping the automatic driving mode when the second deceleration amount exceeds the predetermined threshold value.

Advantageous Effects of Invention

The present disclosure provides a control device of a vehicle and a control method of a vehicle capable of optimally controlling deceleration of a vehicle, based on a deceleration amount when a vehicle is driven in an automatic driving mode and a deceleration amount according to an operation of a brake pedal by a driver.

DESCRIPTION OF EMBODIMENTS

Hereinafter, several embodiments according to the present invention will be described with reference to drawings. However, the description is intended to be merely an exemplification of a preferable embodiment of the present invention, and does not intend the present invention to be limited to such a specific embodiment. Note that, in the following description, the same reference sign is provided to a similar component.

Figure 1:
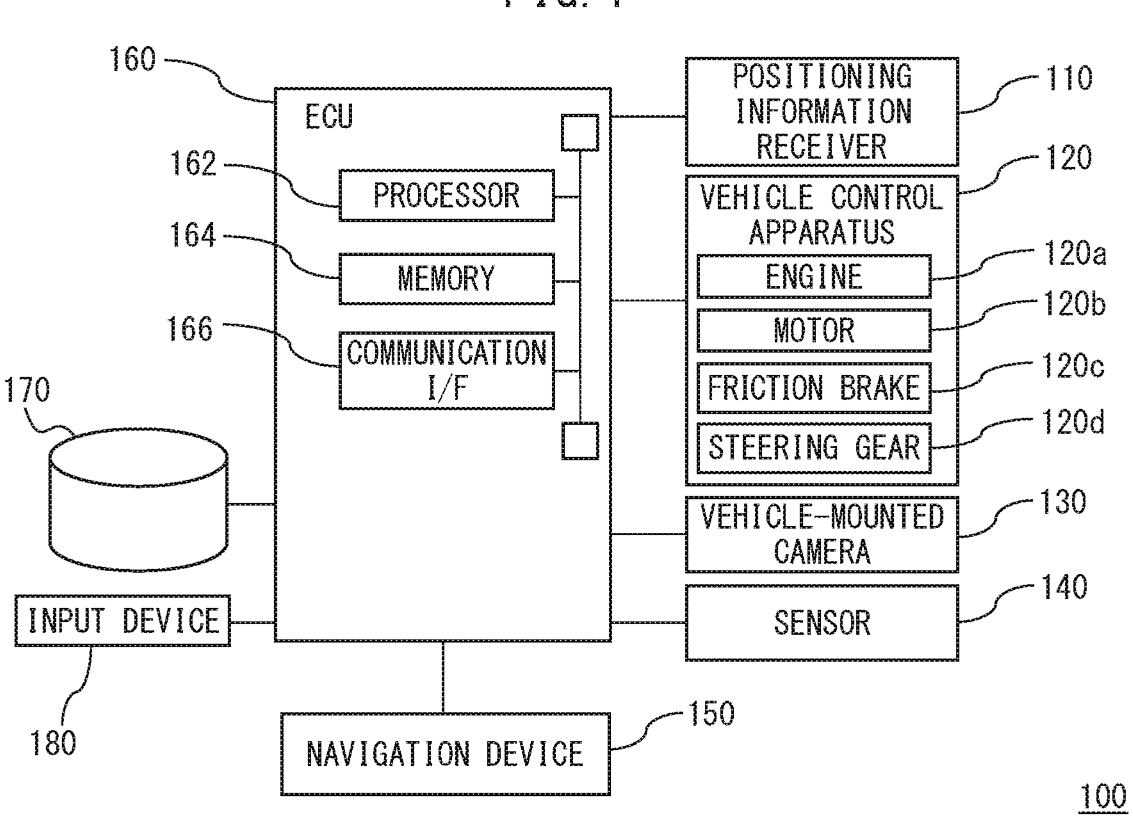
FIG. 1 is a schematic diagram illustrating a configuration of a vehicle control system mounted on a vehicle.

FIG. 1 is a schematic diagram illustrating a configuration of a vehicle control system mounted on a vehicle 100. The vehicle control system is applied to, for example, a system that enables traveling (hands-off traveling) while a driver drives a vehicle with no hands on a steering wheel. In the present embodiment, as such traveling, for example, traveling at approximately a level 2 or a level 3 or higher set by Society of Automotive Engineers (SAE) is assumed. Note that, hereinafter, traveling at the level is also referred to as automatic driving by a vehicle.

The vehicle control system includes a positioning information receiver 110, a vehicle control apparatus 120, a vehicle-mounted camera 130, one or more sensors 140, a navigation device 150, an electronic control unit (ECU, hereinafter referred to as an ECU) 160, a storage device 170, and an input device 180. Each of the positioning information receiver 110, the vehicle control apparatus 120, the vehicle-mounted camera 130, the one or more sensors 140, the navigation device 150, the ECU 160, the storage device 170, and the input device 180 is communicably connected via an in-vehicle network conforming to a standard such as the Controller Area Network (CAN) and Ethernet (registered trademark).

The positioning information receiver 110 acquires positioning information indicating a current position and a posture of the vehicle 100. For example, the positioning information receiver 110 can serve as a global positioning system (GPS) receiver. Every time the positioning information receiver 110 receives the positioning information, the positioning information receiver 110 outputs the acquired positioning information to the ECU 160 via the in-vehicle network.

The vehicle control apparatus 120 is various apparatuses involved in vehicle control, and includes an engine 120*a* and a motor 120*b* as a driving source that causes a vehicle to travel, a friction brake 120*c*, a steering gear 120*d*, a gearbox (not illustrated), and the like. Note that FIG. 1 illustrates a case where the vehicle is a plug-in hybrid vehicle (PHV), and the motor 120*b* is not included in the vehicle control apparatus 120 when the vehicle is an engine vehicle. Further, when the vehicle is an electric vehicle (EV), the engine 120*a* is not included in the vehicle control apparatus 120.

The vehicle-mounted camera 130 includes a two-dimensional detector configured with an array of photoelectric conversion elements having sensitivity to visible light, such as a CCD or a C-MOS, and an imaging optical system that forms an image of a region to be captured on the two-dimensional detector. The vehicle-mounted camera 130 is provided near a dashboard, a front glass or the like in a vehicle, captures surroundings of the vehicle 100 for each predetermined capturing cycle (for example, 1/30 second to 1/10 second), and generates an image indicating the surroundings of the vehicle 100. An image acquired by the vehicle-mounted camera 130 is preferably a color image. Further, the vehicle-mounted camera 130 may be formed of a stereo camera, and may be configured to acquire a distance from a parallax of left and right images to each structure on the image. Every time the vehicle-mounted camera 130 generates an image, the vehicle-mounted camera 130 outputs the generated image to the ECU 160 via the in-vehicle network.

The one or more sensors 140 include a brake sensor that detects a depression amount of a brake pedal by a driver, and the like.

The navigation device 150 obtains an intended traveling route from a current position of the vehicle 100 to a destination according to a predetermined route search technique such as a Dijkstra method.

The ECU 160 includes a processor 162, a memory 164, and a communication interface 166. The processor 162 includes one or a plurality of central processing units (CPUs) and a peripheral circuit thereof. The processor 162 may further include another arithmetic circuit such as a logical arithmetic unit, a numerical arithmetic unit, or a graphic processing unit. The memory 164 includes, for example, a volatile semiconductor memory and a non-volatile semiconductor memory. The memory 164 stores various pieces of information about control according to the present embodiment. The communication interface 166 includes an interface circuit for connecting the ECU 160 to the in-vehicle network.

The storage device 170 includes, for example, a hard disk device or an optical recording medium and an access device thereof. The storage device 170 stores various pieces of information such as a high-definition map. Note that the storage device 170 may store a computer program for performing processing being performed on the processor 162.

The input device 180 is a device to which operation information by a driver is input, and is formed of a button, a touch sensor, and the like. Setting for switching driving of the vehicle 100 to an automatic driving mode is input to the input device 180 by an operation of a driver. Further, information such as a destination is input to the input device 180 by an operation of a passenger. When setting for the automatic driving mode is input to the input device 180, the vehicle 100 is set in the automatic driving mode and driven by automatic driving.

Figure 2:
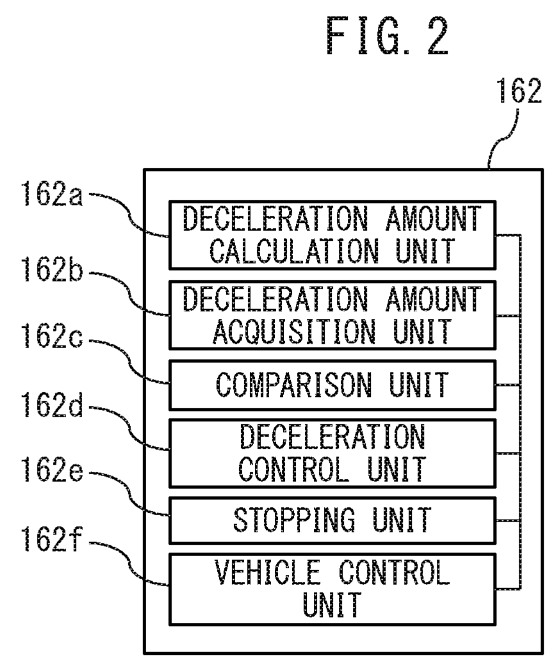
FIG. 2 is a schematic diagram illustrating a functional block of a processor of an ECU included in the vehicle.

FIG. 2 is a schematic diagram illustrating a functional block of the processor 162 of the ECU 160 included in the vehicle 100. The processor 162 is one aspect of a control device of a vehicle according to the present disclosure, and includes a deceleration amount calculation unit 162*a*, a deceleration amount acquisition unit 162*b*, a comparison unit 162*c*, a deceleration control unit 162*d*, a stopping unit 162*e*, and a vehicle control unit 162*f*. Each of the units included in the processor 162 is, for example, a functional module achieved by a computer program operating on the processor 162. In other words, each of the units the processor 162 has is configured by the processor 162 and a program (software) for causing the processor 162 to function. Further, the program may be recorded in the memory 164 of the ECU 160 or a recording medium connected from the outside. Alternatively, each of the units the processor 162 has may be a dedicated arithmetic circuit provided in the processor 162.

The deceleration amount calculation unit 162*a* of the processor 162 calculates a first deceleration amount for controlling deceleration of the vehicle 100 during vehicle driving in the automatic driving mode. Note that the "deceleration amount" in the present embodiment is a value indicating a reduction amount of speed per unit time, and is an absolute value of negative acceleration. Specifically, the deceleration amount calculation unit 162*a* applies, to a high-precision map stored in the storage device 170, position information indicating a current position of the vehicle 100 acquired by the positioning information receiver 110, and calculates the first deceleration amount for controlling deceleration of the vehicle 100 in such a way that a distance from a structure such as a building, a guardrail, a wall, or a curb being present along a lane around the current position acquired from the high-precision map to the vehicle 100 does not fall below a predetermined distance threshold value, and a distance to an object (including the structure described above and another vehicle such as a preceding vehicle) around the vehicle 100 being recognized from an image generated by the vehicle-mounted camera 130 does not fall below the predetermined distance threshold value. Note that, for example, by template matching between a template image of an object and an image generated by the vehicle-mounted camera 130 or by an input of the image generated by the vehicle-mounted camera 130 to a discriminator subjected to machine learning for object detection, an object around the vehicle 100 is recognized from the image generated by the vehicle-mounted camera 130.

Note that, as the discriminator described above, for example, a segmentation discriminator can be used. The segmentation discriminator is previously learned in such a way as to output, from an input image for each pixel of the image, a likelihood that an object having a probability of being indicated by the pixel is indicated by the pixel, for each kind of the object, and to identify that the object having a maximum likelihood is indicated. The deceleration amount calculation unit 162*a* can use, as such a discriminator, a deep neural network (DNN) having an architecture of a segmentation convolutional neural network (CNN) such as a fully convolutional network (FCN), for example. Alternatively, the deceleration amount calculation unit 162*a* may use a segmentation discriminator according to another machine learning technique, such as Random Forest or a support vector machine. In this case, the deceleration amount calculation unit 162*a* determines a pixel in which any object is captured in an image by inputting the image to the segmentation discriminator. Then, the deceleration amount calculation unit 162*a* sets a group of pixels in which an object of the same kind is captured as a region indicating the object.

The deceleration amount acquisition unit 162*b* of the processor 162 acquires a second deceleration amount of the vehicle 100 according to an operation of a brake pedal when a driver operates the brake pedal during vehicle driving in the automatic driving mode. Specifically, the deceleration amount acquisition unit 162*b* acquires the second deceleration amount, based on a detection value of a brake sensor that detects a depression amount of the brake pedal by the driver.

The comparison unit 162*c* of the processor 162 compares the second deceleration amount and a predetermined threshold value. The predetermined threshold value is, for example, 0.1 G. The predetermined threshold value may be a different value according to a driving state such as a vehicle speed. Further, when the second deceleration amount is equal to or less than the predetermined threshold value, the comparison unit 162*c* compares the first deceleration amount and the second deceleration amount.

When the second deceleration amount is equal to or less than the predetermined threshold value, the deceleration control unit 162*d* of the processor 162 controls deceleration of the vehicle 100 by using a greater value of the first deceleration amount and the second deceleration amount. In this way, even in a case where the second deceleration amount by the brake operation by the driver exceeds the first deceleration amount by system control of automatic driving, when the second deceleration amount is equal to or less than the predetermined threshold value, the vehicle 100 is decelerated by the second deceleration amount. Therefore, the automatic driving mode is not uniformly ended by the brake operation, and a crisis avoidance operation can be achieved by the operation of the brake pedal while driving of the vehicle 100 by the automatic driving mode continues, and convenience improves. Note that the deceleration control unit 162*d* may be included in the vehicle control unit 162*f*.

When the second deceleration amount exceeds the predetermined threshold value, the stopping unit 162*e* of the processor 162 stops the automatic driving mode. In this way, driving of the vehicle 100 is switched to manual driving by the driver, and the vehicle 100 is decelerated by the second deceleration amount according to the operation of the brake pedal by the driver.

When the vehicle 100 is set in the automatic driving mode, the vehicle control unit 162*f* of the processor 162 controls the vehicle control apparatus 120 while referring to a high-precision map, and drives the vehicle 100 by automatic driving to a destination input to the input device 180 by the driver. The vehicle control unit 162*f* drives the vehicle 100 to the destination according to an intended traveling route to the destination being obtained by the navigation device 150. Further, the vehicle control unit 162*f* controls the vehicle control apparatus 120, based on an object, a lane, display of a signal, and the like around the vehicle 100 being acquired from a high-precision map or an image generated by the vehicle-mounted camera 130.

Figure 3:
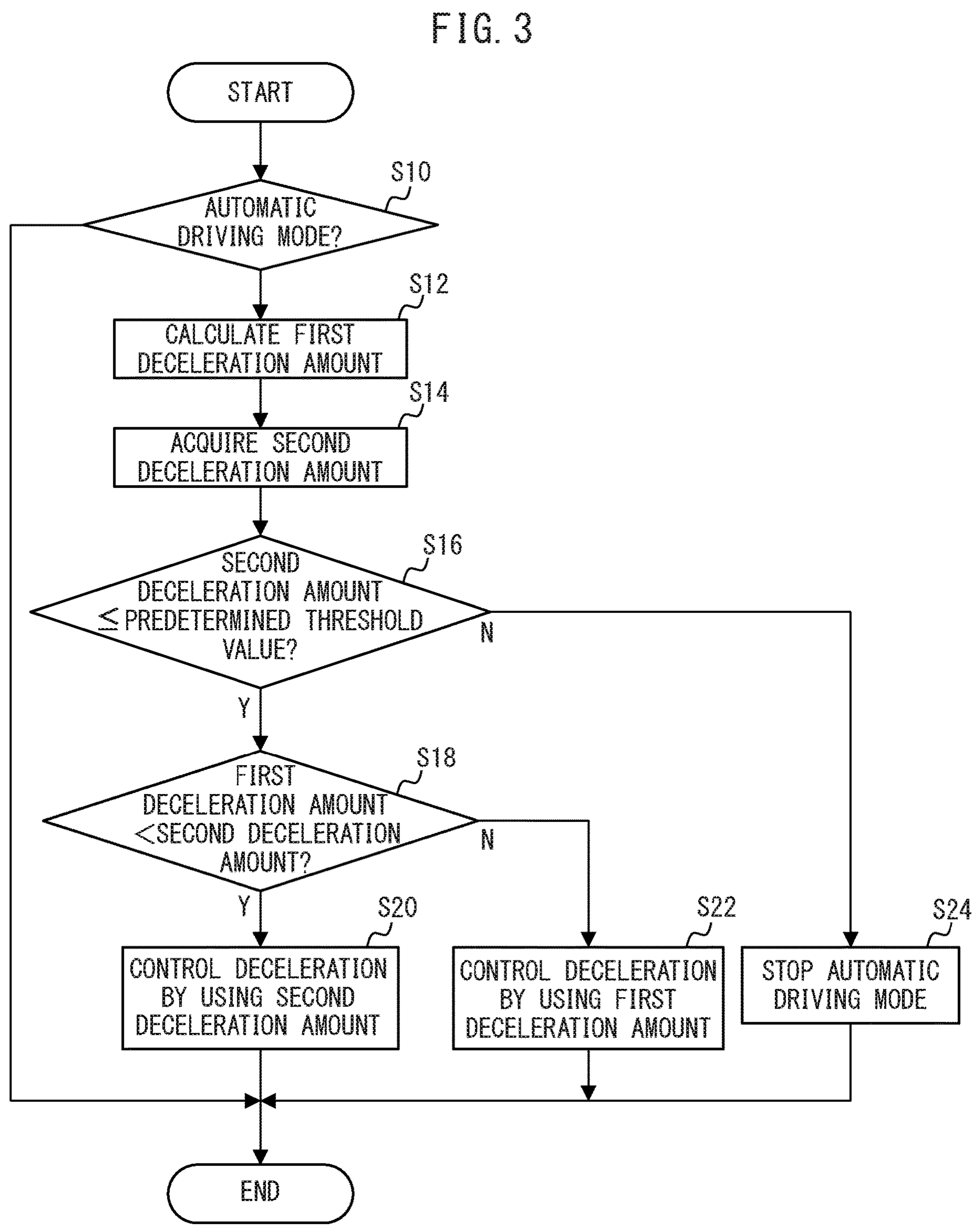
FIG. 3 is a flowchart illustrating processing performed by the processor of the ECU for each predetermined control cycle.

Next, processing performed by the processor 162 of the ECU 160 will be described based on a flowchart in FIG. 3. FIG. 3 is the flowchart illustrating the processing performed by the processor 162 of the ECU 160 for each predetermined control cycle.

First, the processor 162 determines whether the vehicle 100 is set in an automatic driving mode (step S10). When the automatic driving mode is set, the deceleration amount calculation unit 162*a* of the processor 162 calculates a first deceleration amount (step S12). On the other hand, when the automatic driving mode is not set, the processing in the present control cycle ends.

Next, the deceleration amount acquisition unit 162*b* of the processor 162 acquires a second deceleration amount (step S14). Next, the comparison unit 162*c* of the processor 162 compares the second deceleration amount and a predetermined threshold value, and when the second deceleration amount is equal to or less than the predetermined threshold value (YES in step S16), the comparison unit 162*c* compares the first deceleration amount and the second deceleration amount (step S18).

When the second deceleration amount is greater than the first deceleration amount (YES in step S18), the deceleration control unit 162*d* of the processor 162 controls deceleration of the vehicle 100 by using the second deceleration amount (step S20).

On the other hand, when the second deceleration amount is equal to or less than the first deceleration amount (NO in step S18), the deceleration control unit 162*d* of the processor 162 controls deceleration of the vehicle 100 by using the first deceleration amount (step S22).

Further, when the second deceleration amount is greater than the predetermined threshold value in step S16, the stopping unit 162*e* of the processor 162 stops the automatic driving mode (step S24). After steps S20, S22, and S24, the processing in the present control cycle ends.

As described above, according to the present embodiment, by controlling deceleration of a vehicle by using a greater value of a first deceleration amount for controlling deceleration of the vehicle during vehicle driving in an automatic driving mode and a second deceleration amount according to an operation of a brake pedal by a driver, a crisis avoidance operation by the brake pedal can be achieved while traveling control by the automatic driving mode continues. Since traveling control by the automatic driving mode is not uniformly ended even when the second deceleration amount by the brake operation by the driver exceeds the first deceleration amount by system control of automatic driving, convenience improves.

The invention claimed is:

1. A control device of a vehicle comprising:

a processor configured to:

calculate a first deceleration amount for controlling deceleration of a vehicle during vehicle driving in an automatic driving mode;

acquire a second deceleration amount of the vehicle according to an operation of a brake pedal when a driver operates the brake pedal;

control deceleration of the vehicle by using a greater value of the first deceleration amount and the second deceleration amount when the second deceleration amount is equal to or less than a predetermined threshold value for stopping the automatic driving mode during vehicle driving in the automatic driving mode; and stop the automatic driving mode when the second deceleration amount exceeds the predetermined threshold value.

2. A control method of a vehicle comprising:

calculating a first deceleration amount for controlling deceleration of a vehicle during vehicle driving in an automatic driving mode;

acquiring a second deceleration amount of the vehicle according to an operation of a brake pedal when a driver operates the brake pedal;

controlling deceleration of the vehicle by using a greater value of the first deceleration amount and the second deceleration amount when the second deceleration amount is equal to or less than a predetermined threshold value for stopping the automatic driving mode during vehicle driving in the automatic driving mode; and stopping the automatic driving mode when the second deceleration amount exceeds the predetermined threshold value.

* * * * *